（12） United States Patent
Kawai et al.

(10) Patent No.: US 10,077,740 B2
(45) Date of Patent: Sep. 18, 2018

(54) FOLDING DOOR THRUST REVERSERS FOR AIRCRAFT ENGINES

(71) Applicant: The Boeing Company, Chicago, IL (US)

(72) Inventors: Ronald Tatsuji Kawai, Rancho Palos Verdes, CA (US); John Bonet, Placentia, CA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 14/885,284

(22) Filed: Oct. 16, 2015

(65) Prior Publication Data

US 2017/0107944 A1  Apr. 20, 2017

(51) Int. Cl.
*F02K 1/76* (2006.01)
*F02K 1/72* (2006.01)
*F02K 1/70* (2006.01)
*F02K 3/06* (2006.01)

(52) U.S. Cl.
CPC ............ *F02K 1/763* (2013.01); *F02K 1/70* (2013.01); *F02K 1/72* (2013.01); *F02K 1/766* (2013.01); *F02K 3/06* (2013.01); *F05D 2260/38* (2013.01)

(58) Field of Classification Search
CPC ... F02K 1/763; F02K 1/70; F02K 1/72; F02K 1/766; F02K 1/74; F02K 1/76
USPC ......... 60/226.2, 230; 244/110 B; 239/265.29
See application file for complete search history.

(56) References Cited

U.S. PATENT DOCUMENTS

| 3,248,878 A | * | 5/1966 | Clark | ................. | B64C 29/0025 |
| | | | | | 239/265.25 |
| 3,280,561 A | | 10/1966 | Kutney | | |
| 3,764,096 A | * | 10/1973 | Wright | ..................... | F02K 1/62 |
| | | | | | 239/265.29 |
| 3,815,357 A | | 6/1974 | Brennan | | |
| 3,981,451 A | * | 9/1976 | Prior | ......................... | F02K 1/72 |
| | | | | | 239/265.31 |

(Continued)

FOREIGN PATENT DOCUMENTS

| EP | 2573375 | | 3/2013 | | |
| GB | 1197028 | A * | 7/1970 | ............... | F02K 1/70 |

OTHER PUBLICATIONS

European Patent Office, "Extended European Search Report," issued in connection with European Patent Application No. 16182937.9, dated May 19, 2017, 14 pages.

(Continued)

*Primary Examiner* — William H Rodriguez
*Assistant Examiner* — Thomas Burke
(74) *Attorney, Agent, or Firm* — Hanley, Flight & Zimmerman, LLC

(57) ABSTRACT

Example folding door thrust reversers for aircraft engines are disclosed herein. An example apparatus includes a nacelle of a turbofan engine, where a fan duct is defined between the nacelle and a core of the turbofan engine. The example apparatus includes an opening in the nacelle between an outside of the nacelle and the fan duct and an inner door and an outer door disposed within the opening and pivotably coupled to the nacelle along aft edges thereof. The example inner and outer doors are pivotable between a first position in which the inner door and the outer door are disposed within the opening and oriented substantially parallel to each other, and a second position in which the inner door is disposed in the fan duct and oriented substantially perpendicular to an outer surface of the core and the outer door extends outward from the nacelle.

12 Claims, 8 Drawing Sheets

(56) References Cited

U.S. PATENT DOCUMENTS

| | | | |
|---|---|---|---|
| 4,137,711 A | | 2/1979 | Montgomery |
| 4,760,960 A | * | 8/1988 | Ward ..................... F02K 1/002 |
| | | | 239/265.25 |
| 5,224,342 A | | 7/1993 | Lair |
| 5,315,821 A | * | 5/1994 | Dunbar .................... F02K 1/70 |
| | | | 244/110 B |
| 7,836,681 B2 | * | 11/2010 | Pesyna ................... B64C 15/02 |
| | | | 244/23 A |
| 2004/0068978 A1 | | 4/2004 | Lair et al. |
| 2004/0195443 A1 | | 10/2004 | Lair |
| 2005/0102996 A1 | * | 5/2005 | Lair ................... E05B 47/0607 |
| | | | 60/226.2 |
| 2013/0067884 A1 | | 3/2013 | Bhatt |
| 2013/0269366 A1 | * | 10/2013 | Haugen .................... F02C 6/08 |
| | | | 60/783 |
| 2014/0110503 A1 | | 4/2014 | Teulou et al. |
| 2015/0097056 A1 | * | 4/2015 | Caruel .................... F02K 1/09 |
| | | | 239/265.19 |

OTHER PUBLICATIONS

European Patent Office, "Partial European Search Report," issued in connection with European Patent Application No. 16182937.9, dated Mar. 14, 2017, 8 pages.

Asbury et al., "Static Performance of Six Innovative Thrust Reverser Concepts for Subsonic Transport Applications. Summary of the NASA Langley Innovative Thrust Reverser Test Program," NASA/TM-2000-210300, Jul. 2000, 369 pages.

Daggett et al., "Ultra-Efficient Engine Diameter Study", NASA/CR—2003-212309, May 2003, 63 pages.

Johansson et al., "Development of Trent 700 Thrust Reverser Overhaul Package", School of Innovation, Design and Engineering, Malardalen University, Sweden, Bachelor Thesis in Aeronautical Engineering, Report code:MDH.IDT. FLYG.0233.2011.GN300. 15HP.M, May 30, 2011, 37 pages.

Purdue University School of Aeronautics and Astronautics, "Thrust Reversing", retrieved from [URL:https://engineering.purdue.edu/~propulsi/propulsion/jets/basics/reverse.html] on Oct. 15, 2015, 2 pages.

Wikipedia, "Thrust reversal", retrieved from [URL:https://en.wikipedia.org/wiki/Thrust_reversal] on Oct. 15, 2015, 7 pages.

Yetter, "Why Do Airlines Want and Use Thrust Reversers? A Compilation of Airline Industry Responses to a Survey Regarding the Use of Thrust Reversers on Commercial Transport Airplanes," NASA Technical Memorandum 109158, Jan. 1995, 66 pages.

\* cited by examiner

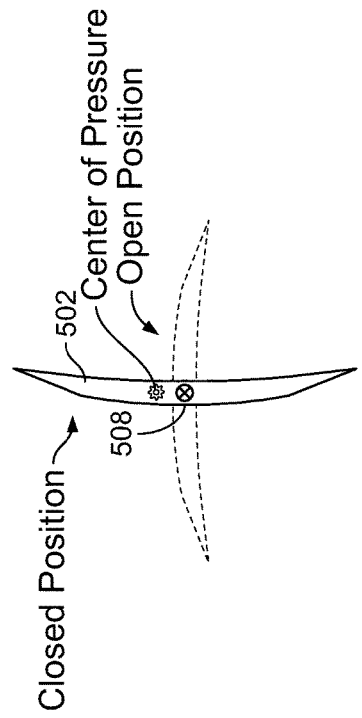
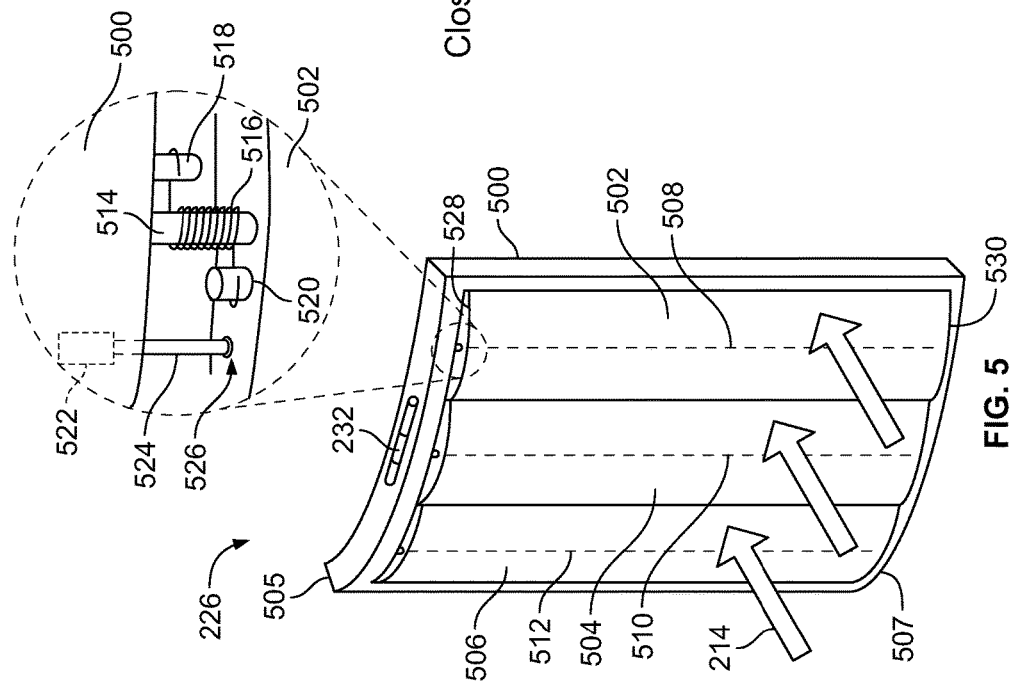

FOLDING DOOR THRUST REVERSERS FOR AIRCRAFT ENGINES

FIELD OF THE DISCLOSURE

This disclosure relates generally to aircraft engines and, more particularly, to folding door thrust reversers for aircraft engines.

BACKGROUND

Aircraft turbofan engines often employ thrust reversal systems to produce a reverse thrust to help decelerate the aircraft upon landing (e.g., after touchdown) or a rejected takeoff, thereby reducing brake wear and enabling shorter landing distances. For example, thrust reversal systems may be deployed upon landing to provide additional stopping forces in adverse weather conditions (e.g., on wet, slushy or slippery runways). To produce reverse thrust and/or reduce forward thrust, some known thrust reversal systems of turbofan engines include a translating cowl and cascade system to redirect or spoil airflow in a fan duct (e.g., provided by a fan of the turbofan engine) that would otherwise produce a forward thrust. Other known thrust reversal systems utilize relatively large doors in the nacelle that pivot about centers of the respective doors to block the airflow in the fan duct.

SUMMARY

An example apparatus disclosed herein includes a nacelle of a turbofan engine. A fan duct is defined between the nacelle and a core of the turbofan engine. The example apparatus includes an opening in the nacelle between an outside of the nacelle and the fan duct. The example apparatus also includes an inner door and an outer door disposed within the opening and pivotably coupled to the nacelle along aft edges of the inner door and the outer door. The inner door and the outer door of the disclosed example apparatus are pivotable between (1) a first position in which the inner door and the outer door are disposed within the opening and oriented substantially parallel to each other, and (2) a second position in which the inner door is disposed in the fan duct and oriented substantially perpendicular to an outer surface of the core and the outer door extends outward from the nacelle.

Disclosed herein is example thrust reverser apparatus for use with a turbofan engine. The example apparatus includes an outer door and an inner door pivotably coupled to the outer door via a hinge. In the example apparatus, the inner door and the outer door are to be pivotably coupled to an opening in a nacelle of the turbofan engine such that the inner door is rotatable into a passageway formed between the nacelle and a core cowl of the turbofan engine. The inner door of the example apparatus includes a frame and a first vane rotatably coupled the frame.

Disclosed herein is example thrust reverser apparatus for use with a turbofan engine that includes a first outer door coupled to a second outer door and a first inner door coupled to a second inner door. The first inner door is coupled to the first outer door. In the example apparatus, the first inner door and the first outer door are to be coupled to an opening in a nacelle of the turbofan engine. The first and second inner doors are movable between (1) a folded position in which the second inner door is parallel to the first inner door, and (2) an extended position in which the first and second inner doors extend into a fan duct defined between the nacelle and a core cowl of the turbofan engine.

BRIEF DESCRIPTION OF THE DRAWINGS

FIG. 5 illustrates the example inner door of the example thrust reverser of FIG. 2A having rotatable vanes.

FIG. 6 is a cross-sectional view of one of the rotatable vanes of FIG. 5 showing an example axis of rotation.

Figure 1:
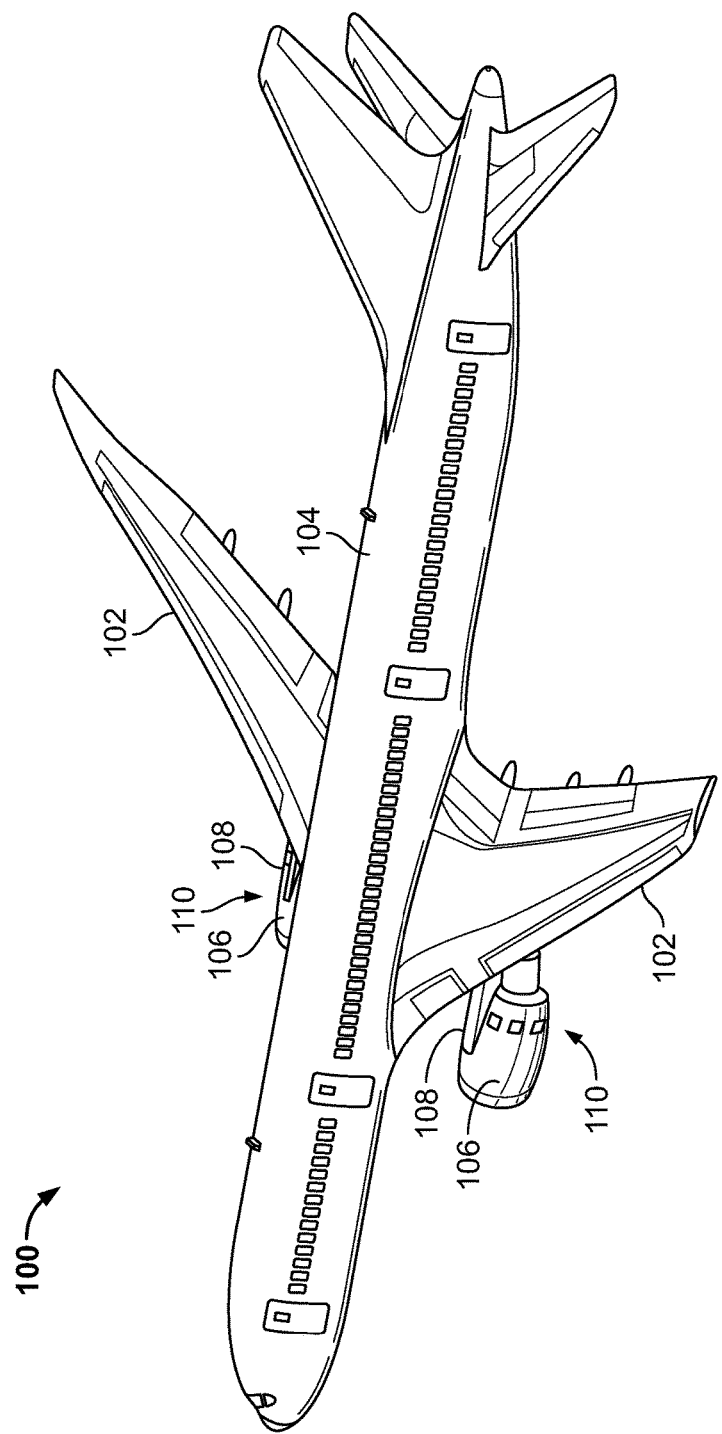
FIG. 1 depicts an example aircraft having an example turbofan engine capable of employing an example thrust reverser constructed in accordance with the teachings disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example thrust reversers for use with aircraft engines, such as turbofan engines. The example thrust reversers disclosed herein utilize less space than known thrust reversers and require less actuating force to deploy and/or retract. As such, the example thrust reversers are generally lighter, smaller and more easily integrated into the airframe structure of a turbofan engine. Further, the example thrust reversers disclosed herein are structurally compatible with turbofan engines having relatively high bypass ratios (such as those implementing variable area nozzles) and produce efficient reverse thrust to decelerate an aircraft. However, before turning to the detailed aspects of the disclosed example thrust reversers, a brief discussion of high bypass ratio turbofan engines and known thrust reverser systems is provided below.

A turbofan engine, sometimes referred to as a fanjet, is a common type of air-breathing jet engine used in aircraft propulsion. A turbofan engine includes an engine core (e.g., gas turbine engine) and a fan, powered by the engine core, which produce thrust by accelerating air rearwards. In contrast to a turbojet engine, in a turbofan engine some of the air bypasses the engine core through a fan duct or bypass formed between a nacelle and the engine core. As used herein, bypass ratio (BPR) refers to the ratio between the mass flow rate of air through the fan duct that bypasses the engine core and the mass flow rate of air passing through the engine core. In general, turbofan engines are relatively fuel efficient and have reduced noise compared to other types of aircraft engines. Recent trends in improving thrust specific fuel consumption for subsonic transports has lead to increasing BPRs of turbofan engines. Ultra High Bypass Ratio (UHBPR) engines, for example, have BRPs of 12 and above and provide improved in thrust specific fuel consumption.

However, airframe integration issues become limiting factors in reducing flight fuel consumption of high BPR turbofan engines. In particular, the limitation for continuing to increase the BPR becomes the increasing nacelle drag and/or the weight for very large diameter fans. In other words, improving propulsion efficiency and reducing noise by increasing the BPR in turbofan engines results in increasing the fan diameter for a given thrust. Increasing the fan diameter requires a relatively larger nacelle, which results in increased surface area. As such, to increase the BPR, relatively larger fans are required and, thus, greater weight and drag is produced by the nacelle of the engine.

Additionally, the propulsive efficiency improvement with BPRs above 12 results from the fan pressure ratio dropping below 1.4. With the lower fan pressure ratio, the fan nozzle exit area needs to be increased during take-off to achieve the optimum match for minimum specific fuel consumption (SFC) during cruise. Otherwise, there is excessive back pressure during take-off, resulting in little or no fan stall margin. Therefore, high BPR turbofan engines employ variable area nozzles (VANs) to increase performance and further reduce flyover noise. In particular, VANs can be opened to increase the BPR to reduce noise at the FAA FAR 36 (Federal Aviation Administration Federal Aviation Regulations) cutback and approach noise measuring points. VANs are thus a valuable feature contributing to improving performance and reducing noise in UHBPR turbofan engines.

Known thrust reversers use clamshell or target doors, pivoting doors, or translating cowls with internal blocker doors and cascade turning vanes. While early turbofan engines reversed both fan and core flows, with higher BPR engines, reversing only the fan airflow has been determined to be acceptable by the aircraft community to provide sufficient deceleration (e.g., on slippery runways). The clamshell and target door type thrust reversers are typically used on turbojet engines and low to medium BPR turbofan engines. However, the weight penalty for clamshells and target doors becomes excessive for higher BPR turbofan engines.

For turbofan engines with BPRs of up to about 5 or 6, translating cowl or pivot door reversers are used. Pivoting door reversers utilize pivoting doors are disposed around the nacelle of the turbofan engine. The pivoting doors pivot about their center axes. When deployed, the doors pivot such that the lower half of the door is disposed in the fan duct while the upper half of the door is disposed outside of the nacelle. The lower half of the door is positioned aft of the pivot point to block the internal flow and the flow reversal is done outside of the nacelle by the upper half of the door. However, with turbofan engines having BPRs above about 6, such as UHBPR engines, the pivot door size becomes excessive because of the large fan duct height or width (i.e., the distance between the outer surface of the engine core and the inner surface of the nacelle, which define the bypass or fan duct passageway).

Therefore, translating cowl thrust reversers are typically used for turbofan engines with BPRs of 6 and above. Translating cowl thrust reversers employ translating cowls having cascade turning vanes. The cascades may translate or be fixed are used on the highest BPR engines. However, the cascades require an increased area because of blockage from turning vanes and the additional surface area for turning flow within the vanes. Further, translating cowl thrust reversers require extra length for the cascade turning vanes and present integration challenges with VANs and, thus, UHBPR engines.

Disclosed herein are example thrust reversers (e.g., reverse thrust apparatus) for use with turbofan engines. The example thrust reversers utilize folding doors, which include an outer door and an inner door, that are hingeably coupled to an opening in a nacelle of a turbofan engine. In general, the example thrust reversers operate between a first or retracted position (e.g., a non-deployed position, a closed position, etc.), in which the inner and outer doors are folded and stored in the opening in the nacelle, and a second or deployed position (e.g., an open position, an extended position, etc.) in which the inner door is rotated into a fan duct of the turbofan engine and the outer door is rotated to extend outward or away from the nacelle. In the deployed position, the inner door blocks the airflow through the fan duct, thereby directing the airflow in the fan duct through the opening in the nacelle. The outer door further directs the airflow outward from the nacelle. In some examples, in the deployed position, the outer door is angled to direct the airflow in the reverse direction (i.e., in a direction opposite of the thrust created by the engine core).

In some examples, in the deployed position, the inner door is rotated to a position in which the inner door is perpendicular to the engine core and/or the direction of the airflow through the fan duct. As such, the length of the inner door is at or near a theoretical length needed to block the airflow in the fan duct (e.g., the shortest distance between the nacelle and the engine core). Therefore, the length of the inner door is smaller than the blocking devices of other known thrust reversal systems. As a result, the opening in the nacelle used to store the inner and outer doors is relatively smaller. Thus, the disclosed example thrust reversers minimize added weight and/or drag of the nacelles, especially for subsonic transports powered by UHBPR engines. In some examples, to further reduce the space used by the example thrust reversers, the inner and outer doors may include hinged extensions that fold back onto themselves in the retracted position, further reducing the length needed in the nacelle to accommodate the example thrust reversers.

In some examples, the inner door and/or outer door are deployed and/or retracted via one or more actuators. In some examples, to decrease actuating force needed to retract the inner door from the deployed position, the inner door includes one or more shutter vanes that rotate between a closed position and an open position. In the closed position the shutter vane(s) block the airflow through the fan duct, thereby diverting the airflow through the opening in the nacelle. When retracting the inner door, the shutter vane(s) may be rotated to the open position, such that the airflow in the fan duct can flow through the inner door. As a result, the force generated by the airflow against the inner door is less than with the shutter vane(s) closed and, thus, less actuating force is needed to retract the inner door. In some examples, the shutter vane(s) are biased, via springs, in the closed position. Additionally or alternatively, the shutter vane(s) may be locked in the closed position. When retracting the inner door, for example, the shutter vane(s) may be unlocked or released. In such an example, the airflow acting against the shutter vane(s) causes the vane(s) to rotate to the open position (e.g., by overcoming the biasing force from the spring(s)), thereby allowing the airflow to pass through the inner door. As a result, smaller (and, thus, lighter) actuating device(s) may be utilized to move the inner door between the deployed and retracted position.

In some examples disclosed herein, the thrust reverser includes a hatch or door along an inner surface of the nacelle (e.g., the boundary of the fan duct) that opens to allow the airflow into the space between the inner and outer folded doors. The high pressure airflow in the fan duct then flows into the space between the inner and outer doors and acts to open or deploy the inner and outer doors. As such, minimal actuating force (if any) is needed to deploy the example thrust reverser. Therefore, smaller (and, thus, lighter) actuating device(s) may be utilized to move the inner door between the retracted and deployed position. In some examples, the hatch is biased, via a spring, toward the closed position. In some examples, the hatch is also locked via a latch in the closed position. To open the hatch, the latch is unlocked. The high pressure airflow through the fan duct counters the spring force and opens the hatch and, thus, allows the high pressure airflow to pressurize the space between the inner and outer doors.

Further, the example thrust reversers disclosed herein are structurally compatible with VANs employed on UHBPR turbofan engines, for example. In some examples, the thrust reversers include a reverser frame that may be integrated with and/or coupled to the VAN. The example thrust reversers, which employ folding doors, use relatively less space and are generally lighter than known thrust reversers. Thus, the disclosed example thrust reversers result in reduced sized of the fan nozzle/thrust reverser, particularly when the BPR is greater than 12 and a VAN is employed.

FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is a turbofan engine that may embody aspects of the teachings of this disclosure. For example, the aircraft engine 106 illustrated in FIG.1 includes a thrust reverser 110 constructed in accordance with the teachings disclosed herein.

Figure 2A:
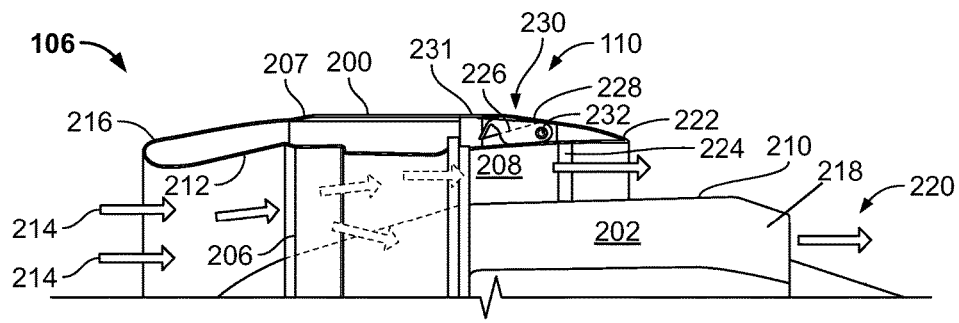
FIG. 2A is a partial cross-sectional view of the example turbofan engine of FIG. 1 showing an example thrust reverser, having an example inner door and an example outer door, in a retracted or non-deployed position.

FIG. 2A is a partially cross-sectioned view of one of the example aircraft engines 106 of FIG. 1. As illustrated in FIG. 2A, the aircraft engine 106 (e.g., a turbofan engine) includes a nacelle 200 (e.g., a fan nacelle) and an engine core 202 (e.g., a gas turbine engine) surrounded by the nacelle 200. Air provided to the engine core 202 is highly pressurized (e.g., via one or more compressors) and provided to a combustion chamber of the engine core 202, where fuel is injected and mixed with the highly pressurized air and ignited. The engine core 202 powers a fan 206 disposed axially upstream from the engine core 202. The fan 206 rotates within a fan cowl 207 (e.g., a fan frame) of the nacelle 200. A fan duct 208 (e.g., a bypass, a passageway, a channel, a nozzle duct, etc.) is defined between an outer wall or core cowl 210 of the engine core 202 and an inner wall 212 of the nacelle 200. As the fan 206 rotates, the fan 206 produces airflow 214 (as shown by the arrows) into an inlet cowl or air intake 216 of the nacelle 200. A portion of the airflow 214 flows to the engine core 202 and a portion of the airflow 214 flows through the fan duct 208 (e.g., aft of the fan cowl 207). The thermal energy from the combustion chamber of the engine core 202 is exhausted (e.g., via one or more turbines) to a nozzle 218. The converted thermal energy of the engine core 202 and the accelerated airflow 214 of the fan duct 208 are exhausted from an aft end 220 of the engine 106 to produce forward thrust that propels the aircraft 100 (e.g., in a forward direction). In the illustrated example, the nacelle 200 includes a variable area nozzle (VAN) 222 (e.g., a fan exit or exhaust nozzle). In some examples, the VAN 222 is supported by one or more struts 224 (e.g., structural supports) disposed radially around the core cowl 210 between the core cowl 210 and the VAN 222.

To reverse the flow path of the thrust and slow the aircraft 100, the example engine 106 of FIG. 2A includes the example thrust reverser 110. In the illustrated example, the thrust reverser 110 includes an internal or inner door 226 (e.g., a thrust reversal blocking door, a first folding door) and an external or outer door 228 (e.g., a deflector door, a second folding door) and that are pivotably coupled to the nacelle 200. The inner door 226 and the outer door 228 are disposed in a port or opening 230 in a thruster reverser frame 231 (e.g., a fixed frame, a reverser frame) that connects an outside of the nacelle 200 and the fan duct 208. The frame 231 may be may be integral with or coupled to the fan cowl 207. In the illustrated example, the VAN 222 is disposed aft (e.g., downstream) of the opening 230. Therefore, in the illustrated example, the nacelle 200 includes the air intake 216, the fan cowl 207, the thruster reverser frame 231, and the VAN 222. The example frame 231 may provide a strong support base for the VAN 222. In some examples, the frame 231 is a separate structure (e.g., a ring-shaped or annular shell) coupled between the fan cowl 207 and the VAN 222. In other examples, the frame 231 is integrally formed with the fan cowl 207 and/or the VAN 222 (e.g., with the strut(s) 224).

In the illustrated example, the inner door 226 and the outer door 228 are pivotably coupled to each other and the nacelle 200 via a hinge 232 (e.g., are hingeably coupled) along rear or after edges of the respective outer and inner doors 226, 228. In particular, in the illustrated example, the inner and outer doors 226, 228 are pivotably coupled to the nacelle 200 in the opening 230. As disclosed in further detail herein, the inner and outer doors 226, 228 of the example thrust reverser 110 are movable (e.g., pivotably, rotatable, etc.) between a retracted (e.g., folded, stored, non-deployed, etc.) position, as illustrated in a FIG. 2A, and a deployed (e.g., unfolded, extended, etc.) position in which the inner door 226 is rotated to block the airflow 214 in the fan duct 208 and the outer door 220 is rotated outward to direct the airflow 214 outward and/or in a reverse direction (e.g., in a direction at least partially opposite to that of the thrust generated by the engine core 202). In the retracted position, as shown in FIG. 2A, the inner and outer doors 226, 228 are disposed or stored within the opening 230 in the nacelle 200 and are oriented substantially parallel to each other.

Figure 2B:
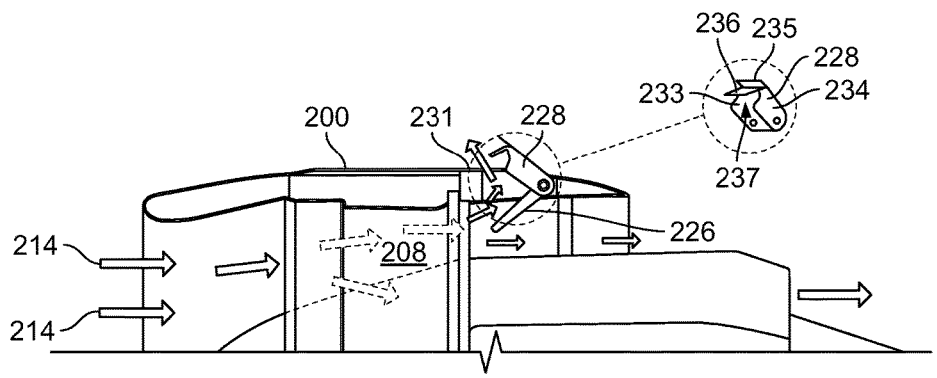
FIG. 2B is a partial cross-sectional view of the example turbofan engine of FIG. 1 showing the example thrust reverser of FIG. 2A in a partially deployed position.

FIG. 2B illustrates the example thrust reverser 110 in a partially deployed position. In the illustrated example, the inner door 226 is rotated downward (in the counter-clockwise direction) (e.g., into the fan duct 208) and the outer door 220 is rotated upwards (in the clockwise direction). In some examples, as disclosed in further detail herein, the inner door 226 and/or the outer door 228 may be rotated via an actuator and/or a spring. In some examples, as disclosed in further detail herein, the inner door 226 and/or the outer door 228 may be deployed with the force of the airflow 214 through the fan duct 208. As the inner and outer doors 226, 228 are opened, the force of the airflow 214 against the inner and outer doors 226, 228 acts to rotate the inner and outer doors 226, 228 and deploying the example thrust reverser 110. A perspective view of the outer door 228 is illustrated in FIG. 2B. As illustrated, the outer door 228 includes a first side wall 233, a second side wall 234 and an outer wall 235 that define an opening 237. In the non-deployed position, as shown in FIG. 2A, the inner door 226 may disposed within the opening 237 of the outer door 228.

Figure 2C:
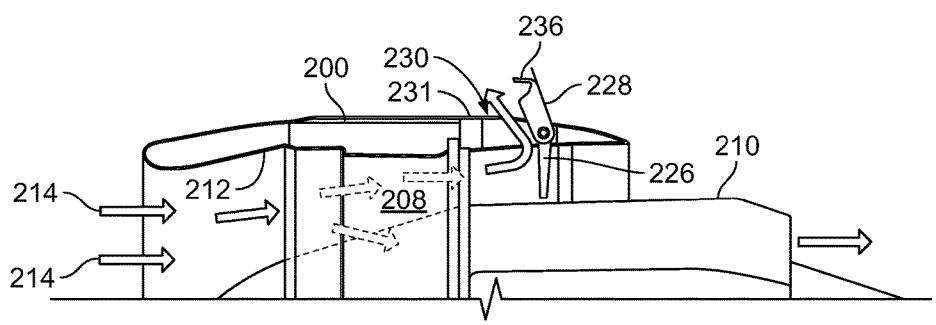
FIG. 2C is a partial cross-sectional view of the example turbofan engine of FIG. 1 showing the example thrust reverser of FIG. 2A in a deployed position.

FIG. 2C illustrates the example thrust reverser 110 in the fully deployed position. As illustrated, the inner door 226 is blocking (e.g., obstructing) the fan duct 208, which directs the airflow 214 through the fan duct 208 upward or outward through the opening 230 and in a direction substantially perpendicular to the direction of the fan duct 208. The airflow 214 is then directed in the reverse (toward the front) direction via the outer door 228. In the example deployed position of FIG. 2C, the inner door 226 is substantially perpendicular to the core cowl 210 of the engine core 202 and/or the direction of the airflow 214 through the fan duct 208. As a result, a length the inner door 226 (e.g., from the hinge to a distal end of the inner door 226) need only be about the same as a height of the fan duct 208 (e.g., a distance between the core cowl 210 and the inner wall 212 of the nacelle 200 near the opening 230). Therefore, the area (e.g., the opening 230) used to accommodate (e.g., store, contain, etc.) the example thrust reverser 110 is smaller than an opening used in many known translating cowl type thrust reversers. In the illustrated example, the inner door 226 is rotated about 90° between the retracted position (e.g., a first position) and the second or deployed position (e.g., a second position). However, in other examples, the inner door 226 may be rotated more or less depending on the relative angle between the nacelle 200 and the core cowl 210.

In some examples, in the deployed position, the outer door 228 is aligned (e.g., coplanar) with the inner door 226 (e.g., rotated 180° relative to the inner door 226). For example, the outer door 228 may be oriented substantially perpendicular to the nacelle 200 in the deployed position. In other examples, the outer door 228 may be angled toward a front of the engine 106 in the deployed position to direct the airflow 214 in the reverse direction. Additionally or alternatively, in some examples a kicker or fence 236 extends from a distal end of the outer door 228 (FIGS. 2B and 2C). The fence 236 is angled with respect to the outer door 228 and acts to direct the airflow 214 in the reverse direction. In some examples, one or more stops may be employed to prevent the outer door 228 from over-rotating.

In some examples, the hinge 232 is spring-loaded (e.g., via a torsion spring) to bias the inner and outer doors 226, 228 to the deployed position. In such examples, the inner and outer doors 226, 228 may be locked (e.g., via an actuator or latch) in the closed position. When the inner and outer doors 226, 228 are unlocked, the spring-loaded hinge 232 biases the inner and outer doors 226, 228 to the deployed position. In some examples, one or more actuators may be employed to deploy and/or retract the inner and outer doors 226, 228, as disclosed in further detail herein. In the illustrated example, the inner and outer doors 226, 228 are substantially trapezoid shaped. In some examples, the inner and outer doors 226, 228 may have longer aft edges (e.g., the edges hear the hinge 232) and shorter fore edges (e.g., are in the shape of a trapezoid). In some examples, the inner and outer doors 226, 228 are curved to match the corresponding profile of the outer shape of the nacelle 200 and the fan duct 208.

In the deployed position, the outer door 228 of the example thrust reverser 110 also produces relatively high base drag (e.g., the drag of the nacelle 200) compared to other known thrust reversers, such as the translating cowl thrust reverser where no base drag is present. Such base drag also aids in decelerating the aircraft 100 more quickly. Additionally, as disclosed herein, the example thrust reverser 110 can also be advantageously used with UHBPR engines, which produce relatively higher ram drag (e.g., drag generated by the use of a relatively large fan intake flow, such as the air intake 216) than smaller BPR engines. In general, the deceleration force on the aircraft 100 is the sum of the reverse thrust (e.g., generated by the example reverser thruster 110), braking ground friction, engine ram drag and/or airplane ram drag. In some examples, even a 10% fan reverser efficiency on a UHBPR engine with the example thrust reverser 110 provides a deceleration comparable to known high BPR thrust reversers that have a higher reverse turning efficiency of about 45%, due to of the much higher deceleration forces from the increased ram drag and/or base drag. Thus, even with less reverse thrust, the example thrust reverser 110 provides comparable, if not better, airplane deceleration capabilities than current high BPR engines that may have high reverse thrust but produce less ram drag and less base drag.

While only one folding door set (e.g., the inner door 226 and the outer door 228) is illustrated in FIGS. 2A-2C, it is understood that in some examples, the example thrust reverser 110 may include a plurality of folding door sets that are disposed circumferentially around the nacelle 200 of the engine 106 (as illustrated in FIG. 1). The folding doors may be substantially the same as any of the example thrust reversers disclosed herein. In some examples, the folding door sets are spaced evenly from each other around the nacelle 200 (e.g., 12 folding door sets disposed every 30°). The example folding door sets may be controlled (e.g., via one or more controllers and/or actuators) to deploy and/or retract substantially simultaneously (e.g., via a thrust reverser control system of the aircraft 100).

Figure 3:
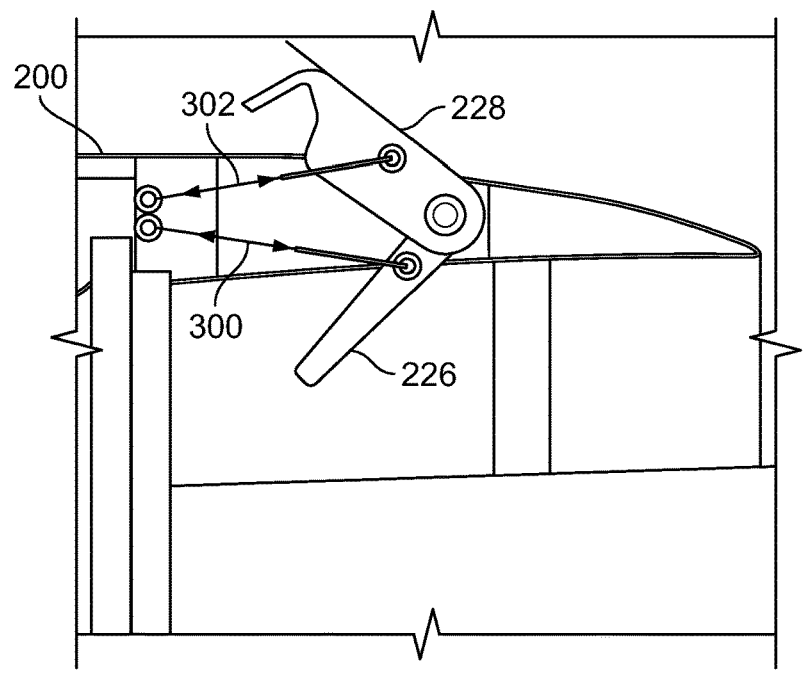
FIG. 3 illustrates example linear actuators capable of deploying and/or retracting the example inner and outer doors of the example thrust reverser of FIG. 2A.

As disclosed herein, in some examples, one or more actuators may be employed to move the inner and outer doors 226, 228 of the example thrust reverser 110 from the retracted position (as shown in FIG. 2A) to the deployed position (as shown in FIG. 2B). The example thrust reverser 110 may employ any hydraulic, pneumatic or electric actuator. For example, FIG. 3 illustrates an example implementation using linear actuators (e.g., push-pull actuators) to move the inner and outer doors 226, 228. In particular, a first linear actuator 300 is coupled between the nacelle 200 and the inner door 226 and a second linear actuator 302 is coupled between the nacelle 200 and the outer door 228. The first and second linear actuators 300, 302 operate to open or close the inner and outer doors 226, 228.

Figure 4:
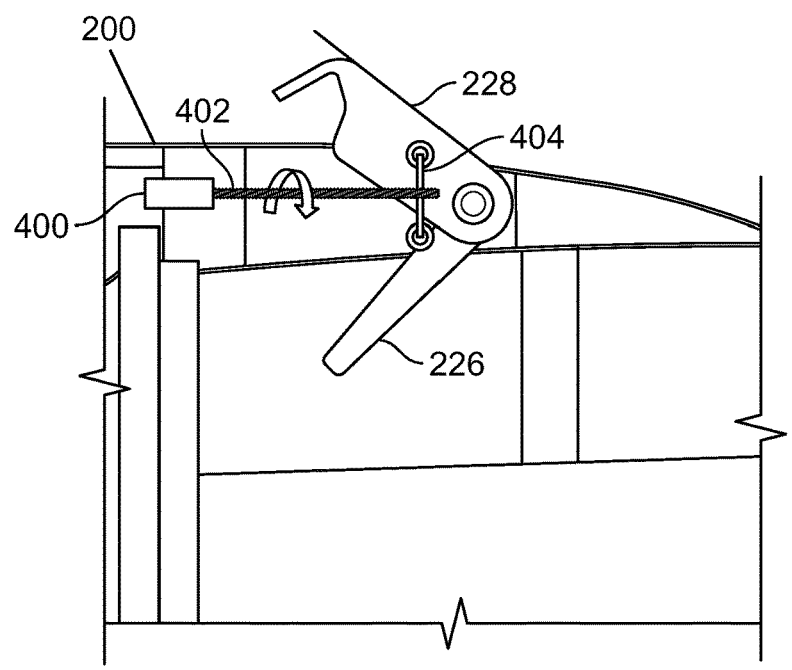
FIG. 4 illustrates an example rotary actuator capable of deploying and/or retracting the example inner and outer doors of the example thrust reverser of FIG. 2A.

FIG. 4 illustrates another example implementation using a rotary actuator to move the inner and outer doors 226, 228. In the illustrated example, a rotary actuator 400 having a linear screw 402 is coupled to the nacelle 200. A translating link 404 (e.g., a plate) having a threaded opening is coupled between the inner door 226 and the outer door 228. As the linear screw 402 is rotated, the link 404 is translated toward or away from the hinge 232 to move the inner and outer doors 226, 228. In other examples, other types of actuators having other arrangements may be implemented to move the inner and outer doors 226, 228.

Once in the deployed position, significant actuating force may be needed to close the inner door 226 against the force of the airflow 214 acting on the inner door 226. In some examples, to substantially reduce and/or eliminate the force needed to retract the inner and outer doors 226, 228, the inner door 226 of the example thrust reverser 110 may include one or more rotatable vanes (e.g., shutter vanes, panels, panes, etc.). FIG. 5 is a perspective view of the example inner door 226. In the illustrated example, the inner door 226 includes a frame 500 and a first vane 502, a second vane 504 and third vane 506 (e.g., shutter vanes, panes, panels, etc.) rotatably coupled to the frame 500. In the deployed position, a top end 505 of the frame 500 is disposed near the nacelle 200 and a bottom end 507 of the frame 500 is disposed at or near the core cowl 210. In some examples, one or more seals may be provided on the bottom end 507 the frame 507 to provide sealing engagement between the inner door 226 and the core cowl 210. In the illustrated example, a portion of the hinge 232 is depicted on a top of the frame 500 to illustrate the axis about which the inner door 226 rotates.

In the illustrated example of FIG. 5, the first, second and third vanes 502, 504, 506 are rotatable between a closed position (as shown in FIG. 5) and an open position, in which the first, second and third vanes 502, 504, 506 are rotated about 90° (e.g., a quarter turn) to allow the airflow 214 (FIG. 2C) to pass between the first, second and third vanes 502, 504, 506 and, thus, through the inner door 226. In the illustrated example, the first, second and third vanes 502, 504, 506 are rotatable about respective first, second and third axes 508, 510, 512.

In some examples, the first, second and third vanes 502, 504, 506 are biased, via springs, in the closed position. An enlarged view of a top of the first vane 502 is illustrated in FIG. 5. As shown, the first vane 502 is coupled to the frame 500 via a first shaft 514 about which the first vane 502 rotates. In the illustrated example, a torsion spring 516 is coupled between a first post 518 extending from the frame 500 and a second post 520 extending from the first vane 502. If the first vane 502 is rotated, the force from the spring 516 biases the first vane 502 back to the closed position. In some examples, a latch 522 is provided to lock the first vane 502 in the closed position. In the illustrated example, the latch 522 is disposed within the frame 500 and includes a locking pin 524 that is movable into a recess or bore 526 in the first vane 502. The latch 522 may be electrically and/or mechanically actuated (e.g., via a signal from a thrust reverser control system implemented in the aircraft 100).

FIG. 6 illustrates a cross-sectional view of the example first vane 502. As shown in the illustrated example, the first vane 502 is rotatable about the first axis 508 between the closed position and the open position (shown in dashed lines). In the illustrated example, the first axis 508 is offset from a center of pressure of the first vane 502. In other words, when the airflow 214 (FIG. 2C) is acting against the first vane 502, the center of pressure created by the pressure from the airflow 214 is offset (e.g., aft) from the first axis 508. As a result, when the latch 522 is opened or unlocked, the force from the airflow 214 rotates the first vane 502 about the first axis 508 into the opened position (as shown in the dashed lines). The spring 516 may be sized to allow the airflow 214 to rotate the first vane 502 when the first vane 502 is unlocked. The second and third vanes 504, 506 (FIG. 5) may also include springs and latches, similar to the spring 516 and the latch 522, and operate in the same way. Thus, when the inner door 226 is deployed, and when the latches (e.g., the latch 522) are opened or unlocked, the first, second and third vanes 502, 504, 506 may be rotated to the open position by the aerodynamic force of the airflow 214. Once in the open position, the inner door 226 may be closed or retracted with relatively less actuating force. After the inner door 226 is retracted, the springs (e.g., the spring 516) of the first, second and third vanes 502, 504, 506 may bias the respective vanes 502, 504, 506 back to the closed position (e.g., when less airflow 214 is acting on the first, second and third vanes 502, 504, 506), as disclosed in further detail herein.

Figure 7A:
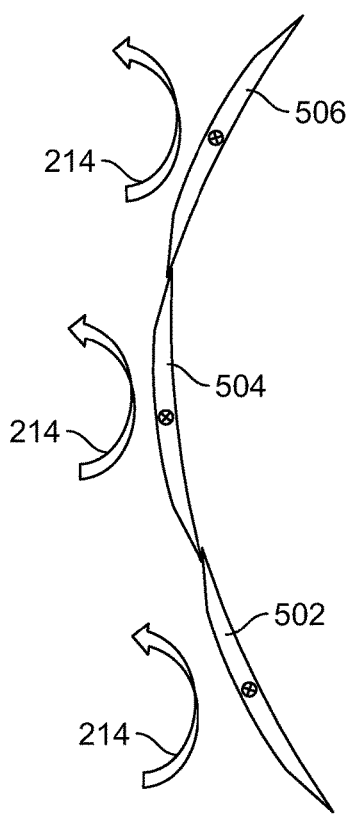
FIG. 7A is a cross-sectional view of the example rotatable vanes of FIG. 5 in a closed position.
Figure 7B:
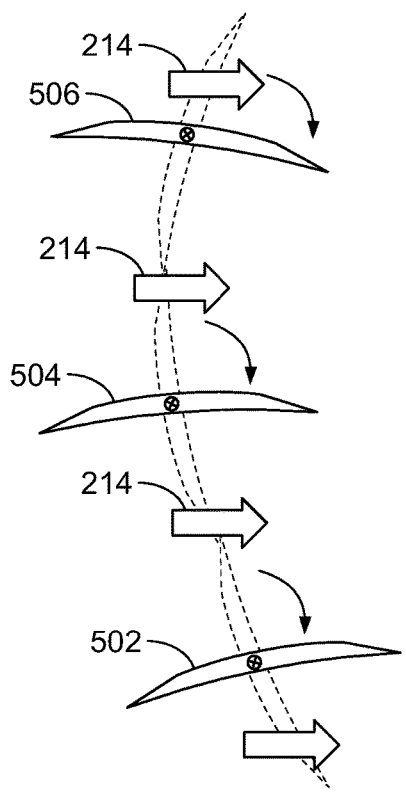
FIG. 7B is a cross-sectional view of the example rotatable vanes of FIG. 5 in an open position.

FIG. 7A illustrates a cross-sectional view of the first, second and third vanes 502, 504, 506 in the closed position and FIG. 7B illustrates the first, second and third vanes 502, 504, 506 in the open position. In the closed position, the airflow 214 is obstructed by the first, second and third panes 502, 504, 506 and, thus, diverted by the inner door 226 up through the opening 230 (FIG. 1) in the nacelle 200 (FIG. 1). When retracting the inner door 226, the latches (e.g., the latch 522 illustrated in FIG. 5) of the first, second and third vanes 502, 504, 506 may be opened to release the first, second and third vanes 502, 504, 506. The pressure from the airflow 214 forces the first, second and third vanes 502, 504, 506 to rotate (e.g., because of the off center rotational axes) to a position in which the first, second and third vanes 502, 504, 506 are substantially parallel to the direction of the airflow 214, as shown in the opened position in FIG. 7B. As such, the difference between the air pressure upstream of the inner door 226 and the air pressure downstream of the inner door 226 is substantially reduced, thereby enabling the inner door 226 to be closed with reduced actuating force.

In some examples, the first, second and third vanes 502, 504, 506 are shaped to act as airfoils and/or rotated to a position to produce a lift force in the forward (e.g., clockwise) direction (e.g., opposite to that of the airflow 214 through the fan duct 208). Such a forward lift force helps retract the inner door 226 when rotating the inner door 226 against the force of the airflow 214. For example, the first vane 502, as illustrated in FIG. 7B, is in a position to produce a forward lift (e.g., to the left in FIG. 7B). The curved shape or profile of the first vane 502 and the position of the first vane 502 relative to the airflow 214 generate a lift force in a direction opposite of the airflow 214. In some examples, the position of the first vane 502 is between about 3° and about 15 ° relative to the oncoming airflow 214. In some examples, the inner door 226 includes a stop to prevent the first vane 502 from over rotating and, thus, hold the first vane 502 in a position that generates lift. In some examples, stops may similarly be provided for the second and third vanes 504, 506 to likewise hold the second and third vanes 504, 506 in optimal positions relative to the oncoming airflow 214 to generate lift force in the opposite direction of the airflow 214.

In the illustrated example, the inner door 226 includes the three example vanes. However, in other examples, the inner door 226 may include more or fewer vanes. Further, in the illustrated example, the first, second and third vanes 502, 504, 506 are oriented vertically (e.g., in a direction to span the height of the fan duct 208 between the core cowl 210 and the nacelle 200). In other words, when the inner door 226 is disposed in the fan duct 208, the first vane 502 is oriented such that a first end 528 (e.g., a top end, an aft end) of the first vane 502 is at or near the nacelle 200 and a second end 530 (e.g., a bottom end, a fore end) is at or near the core cowl 210. However, in other examples, the first, second and third vanes 502, 504, 506 may be oriented horizontally. In some examples, the outer door 228 may additionally or alternatively include one or more rotating vanes, which may operator similar to the first, second and third vanes 502, 504, 506 of the inner door 226.

Figure 8A:
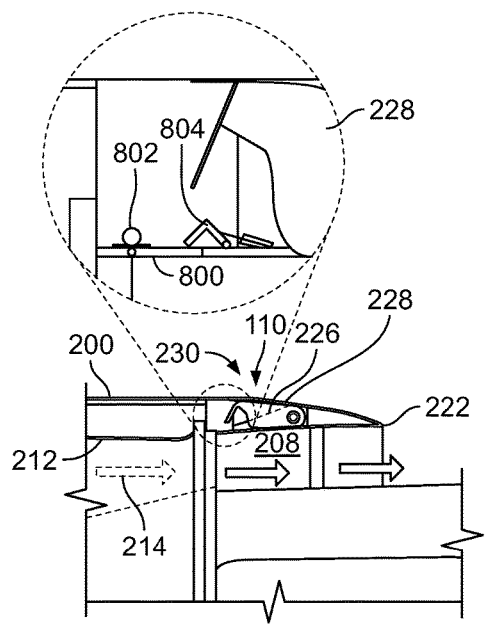
FIGS. 8A-8E illustrate an example sequence of deploying the example thrust reverser of FIG. 2A using an example hatch to pressurize an area between the example inner and outer doors.

FIGS. 8A-8E illustrate an example sequence of deploying the example thrust reverser 110 where little or no actuating force is used. FIG. 8A illustrates the inner and outer doors 226, 228 in the fully retracted or non-deployed position. While in the fully retracted position, the airflow 214 travels through the fan duct 208 and exits the VAN nozzle 222. The relatively high pressure airflow 214 in the fan duct 208 creates a pressure on a bottom of the inner door 226 that maintains the inner door 226 in the closed position. To enable the inner and outer doors 226, 228 to open without any actuation device (or relatively minimal actuating force), the example thrust reverser 110 may include a hatch 800 (e.g., a door, a flap, etc.) along the inner wall 212 of the nacelle 200 adjacent the opening 230. In the enlarged view shown in FIG. 8A, the inner door 226 has been removed for clarity. As illustrated in the enlarged view, the hatch 800 is biased toward a closed position via a spring 802, which is coupled between the nacelle 200 and the hatch 800. In the illustrated example, a latch 804 is employed to lock the hatch 800 in the closed position. The latch 804 may be electrically and/or mechanically actuated (e.g., via a signal from a thrust reverser control system implemented in the aircraft 100).

Figure 8B:
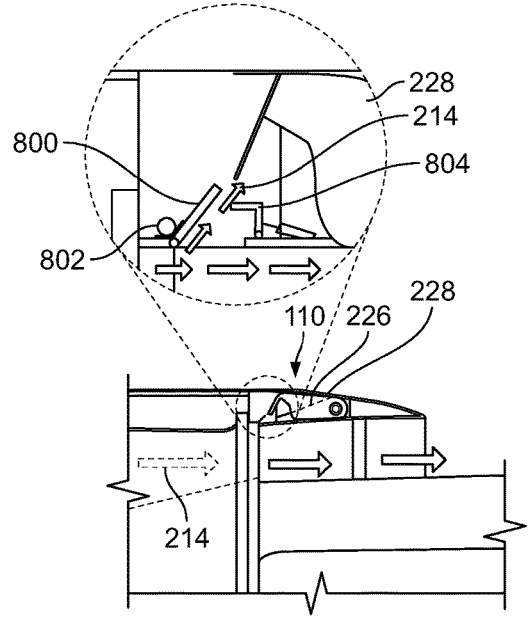

As shown in FIG. 8B, the latch 804 may be unlocked or opened to release the hatch 800. In the enlarged view shown in FIG. 8B, the inner door 226 has been removed for clarity. The high pressure airflow 214 in the fan duct 208 counters (e.g., overcomes) the force from the spring 802 and opens the hatch 800 (e.g., rotates the hatch 800 about a hinge or pivot axis). Once opened, the high pressure airflow 214 flows into the space (e.g., cavity, area, void, etc.) between the inner and outer doors 226, 228, thereby stabilizing or reducing the pressure difference across the two sides of the inner door 226 (e.g., by pressurizing the space between the inner and outer doors 226, 228).

Figure 8C:
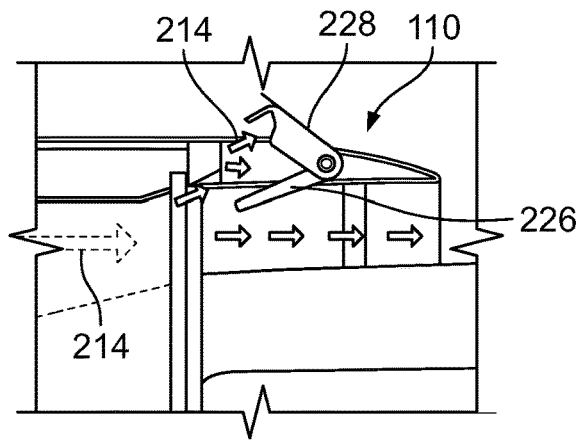
Figure 8D:
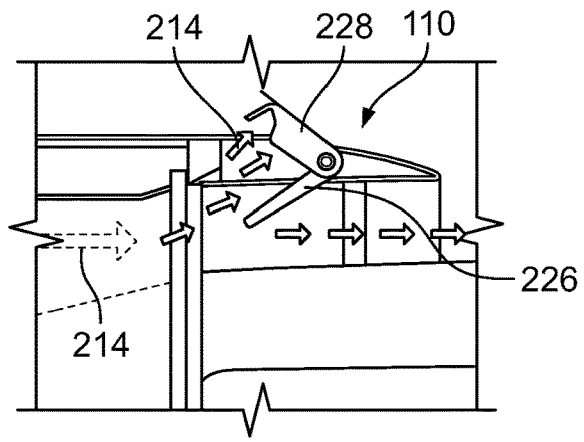

In the illustrated example, the airflow 214 flowing into the hatch 800 forces the inner door 226 to rotate downwards (counter-clockwise) and the outer door 228 to rotate upwards (clockwise), as illustrated in FIGS. 8C and 8D. In some examples, one or more actuators (e.g., the actuators 300, 302 of FIG. 3 or the actuator 400 of FIG. 4) may be used to start the deployment, and then the high pressure airflow 214 blows the inner and outer doors 226, 228 open. FIGS. 8C and 8D show the airflow 214 forcing the inner and outer doors 226, 228 to open or deploy. While deploying, the first, second and third vanes 502, 504, 506 (FIG. 5) of the inner door 226 are in the closed position, thereby providing the maximum surface against which the airflow 214 can act.

Figure 8E:
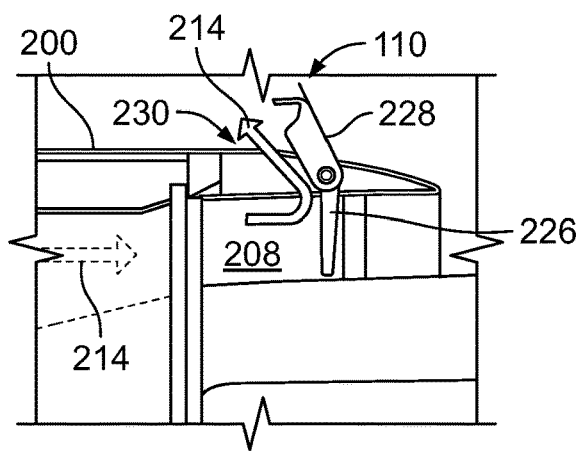

FIG. 8E illustrates the inner and outer doors 226, 228 in the fully open deployed position. As illustrated, the inner door 226 substantially blocks all airflow 214 in the fan duct 208. The airflow 214, as illustrated by the arrows, is directed through the opening 230 in the nacelle 200. In the illustrated example of FIG. 8E, the outer door 228 is angled in the reverse direction, which directs the airflow 214 in the reverse direction (e.g., reverse thrust). In the fully deployed position, the airflow 214 maintains the inner door 226 in the fully deployed position.

To retract the inner and outer doors 226, 228, the first, second and third vanes 502, 504, 506 (FIG. 5) of the inner door 226 may be opened. In particular, the latches (e.g., the latch 522) may be activated or inactivated to unlock the respective first, second and third vanes 502, 504, 506. The force from the airflow 214 against the first, second and third vanes 502, 504, 506 causes the first, second and third vanes 502, 504, 506 to rotate to the open position (as shown in FIG. 7B). As a result, the pressure difference across the inner door 226 (e.g., the difference between the pressure upstream and downstream the inner door 226) is significantly reduced and, thus, minimal force is needed to move the inner door 226 to the fully retracted or non-deployed position. In some examples, the first, second and third vanes 502, 504, 506 are shaped and/or positioned to generate aerodynamic lift to create a retracting force (e.g., in the reverse or clockwise direction). One or more actuator, such as the first and second linear actuators 300, 302 of FIG. 3, or the rotary actuator 400 of FIG. 4, may be implemented to close the inner and outer doors 226, 228. Additionally, because less airflow 214 is diverted by the inner door 226, less airflow 214 is acting on the outer door 228 and, thus, less force is needed by an actuator to retract the outer door 228. As the inner door 226 is rotated back to the retracted position, the aerodynamic forces on the first, second and third vanes 502, 504, 506 decreases to a point at which the biasing forces from the springs (e.g., the spring 516) rotate the first, second and third vanes 502, 504, 506 back to the closed position. Once in the closed positioned, the first, second and third vanes 502, 504, 506 can be locked via the latches (e.g., the latch 522). Further, once the inner door 226 is in the retracted position (as shown in FIGS. 8A and 8B), the latch 804 can be activated to lock the hatch 802 in the closed position. The spring 802 biases the hatch 800 in the closed position, which decreases the force needed by the latch 804 to rotate the hatch 800 against the high pressure airflow 214. In some examples, the hatch 800 is provided on an end of the inner door 226.

Figure 9:
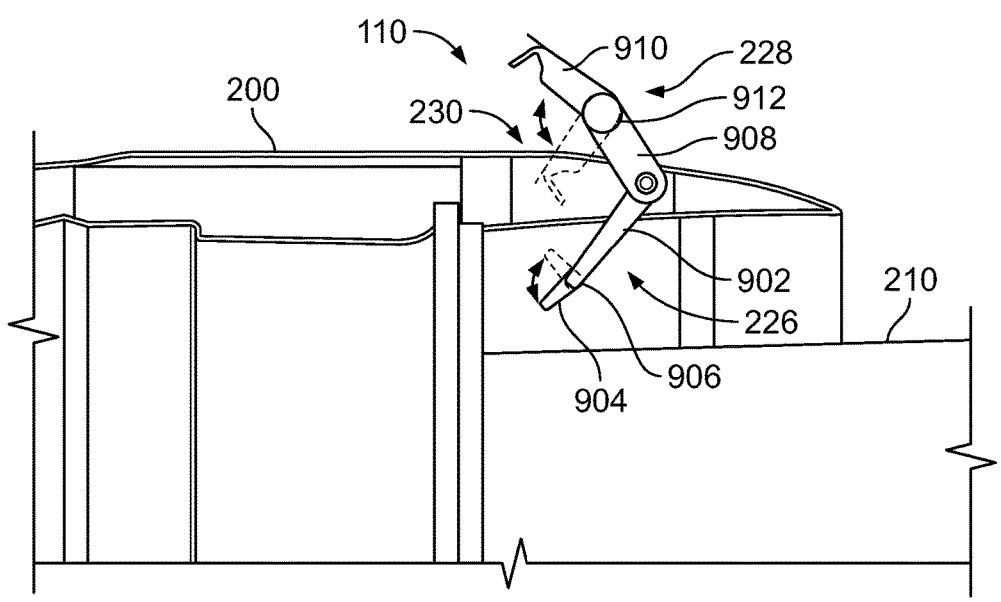
FIG. 9 illustrates the example thrust reverser of FIG. 2A in which the example inner and outer doors include respective hinged extensions.

FIG. 9 illustrates an example in which the inner door 226 and/or the outer door 228 may include hinged extensions. In the illustrated example, the inner door 226 includes a first inner door section 902 (e.g., a first inner door, segment, portion, etc.) and a second inner door section 904 (e.g., a second inner door) that is pivotably coupled to a distal end 906 of the first inner door section 902. Similarly, the outer door 228 includes a first outer door section 908 (e.g., a first outer door) and a second outer door section 910 (e.g., a second outer door) that is pivotably coupled to a distal end 912 of the first outer door section 908. In the retracted position, the second inner door section 904 is folded against (e.g., parallel to) the first inner door section 902 and disposed within the opening 230 in the nacelle 200 between the first inner door section 902 and the first outer door section 908. In some examples, the first inner door section 902 includes an opening to receive the second inner door section 904 in the retracted position Likewise, in the retracted position, the first outer door section 910 is folded against (e.g., parallel to) the first outer door section 908 and disposed within the opening 230 between the first inner door section 902 and the first outer door section 908. In some examples, the first outer door section 908 includes an opening (e.g., similar to the opening 237) to receive the second outer door section 910 in the retracted position. In some examples, the second inner door section 904 is pivotably coupled to the first inner door section 902 via a spring loaded hinge (e.g., with a torsion spring). In such an example, the second inner door section 904 springs open or outward when the first inner door section 902 is deployed and moved away from the opening 230. Additionally or alternatively, in some examples, the second outer door section 910 is pivotably coupled to the first outer door section 908 via a spring-loaded hinge. As such, when the inner and outer doors 226, 228 are deployed, the second inner door section 904 and/or the second outer door section 910 may rotate into position. In some examples, the second inner door section 904 is aligned (e.g., substantially coplanar or aligned along a same plane) as the first inner door section 902 in the deployed position. Additionally or alternatively, in some examples, the second outer door section 910 is aligned (e.g., substantially coplanar or aligned along a same plane) as the first outer door section 908 in the deployed position. In some examples, in the deployed position, the first inner door section 902, the second inner door section 904, the first outer door section 908 and the second outer door section 910 are aligned with each other in the deployed position (e.g., forming a substantially planar wall). In other examples, the second inner door section 904 may be angled with respect to the first inner door section 902 and/or the second outer door section 910 may be angled with respect to the first outer door section 908.

In the example shown in FIG. 9, the total length of the inner door 226 is based on the length of the first inner door section 902 and the second inner door section 906 (and, in some examples, the angle therebetween). As a result, the length or width of the opening 230 may be relatively smaller (e.g., smaller than a width of the fan duct 208 between the core cowl 210 and the nacelle 200). Thus, the length of the nacelle 200 needed to accommodate the example thrust reverser 110 can be relatively small compared to know thrust reversal systems. The example first inner door section 902 and the example first outer door section 908 may be deployed by one or more actuators, as disclosed in the examples herein. The example first inner door section 902 and/or the example second inner door section 904 may include one or more rotatable vanes, which may operate similar to the first, second and third vanes 502, 504, 506 disclosed in connection with FIGS. 5, 6, 7A and 7B.

From the foregoing, it will be appreciated that the above disclosed thrust reversers may be advantageous for turbofan engines having relatively high BPRs. In the illustrated examples, the inner and outer doors of the example thrust reversers fold into a relatively small space compared to known thrust reversers. As a result, less room is need to utilize the example thrust reversers. Further, the example thrust reversers are structurally compatible with engines having VANs, such as UHBPR engines. Additionally, examples are disclosed herein for reducing the actuating force needed to deploy and/or retract the example thrust reversers. As such, smaller and/or lighter actuating devices, if any, can be used. Thus, the example thrust reversers are generally smaller and lighter than known thrust reversers. Therefore, the example thrust reverser enable more compact integration a nacelle and, thus, minimize airframe integration penalties (e.g., added weight, added space, etc.) seen in known thrust reversers.

Although certain example apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:

1. A turbofan engine comprising:
a nacelle;
a core cowl; and
a thrust reverser, the thrust reverser including:
an outer door;
an inner door pivotably coupled to the outer door via a hinge, the inner door and the outer door to be pivotably coupled to an opening in the nacelle such that the inner door is rotatable into a passageway formed between the nacelle and the core cowl, the inner door including a frame and a vane rotatably coupled to the frame, the vane oriented in the frame such that, when the inner door is disposed in the passageway, a rotational axis of the vane extends from the nacelle to the core cowl; and
an actuator coupled between the nacelle and at least one of the outer door or the inner door.

2. The turbofan engine of claim 1, wherein the vane is rotatable between (1) a closed position in which the first vane is to block airflow in the passageway when the inner door is disposed in the passageway and (2) an open position in which the airflow passes through the frame of the inner door when the inner door is disposed in the passageway.

3. The turbofan engine of claim 2, wherein the inner door further includes a spring coupled between the vane and the frame to bias the vane toward the closed position.

4. The turbofan engine of claim 2, wherein the inner door further includes a latch to lock the vane in the closed position.

5. The turbofan engine of claim 2, wherein the actuator is to move the inner door from a deployed position to a retracted position when the vane is in the open position.

6. The turbofan engine of claim 1, wherein the rotational axis is offset from a center of pressure on the vane created by airflow acting on the vane.

7. The turbofan engine of claim 1, wherein the vane is shaped to create a lift force in a direction opposite to that of airflow through the passageway.

8. The turbofan engine of claim 1, wherein the vane is a first vane, and wherein the inner door further includes a second vane rotatably coupled to the frame.

9. The turbofan engine of claim 1, wherein the inner door and the outer door are pivotably coupled along aft edges of the outer door and the inner door to the opening in the nacelle.

10. The turbofan engine of claim 1, wherein the inner door is rotatable between a retracted position in which the inner door is disposed in the opening of the nacelle and a deployed position where the inner door is disposed in the passageway and oriented substantially perpendicular to the core cowl.

11. The turbofan engine of claim 10, wherein the inner door is rotated about 90° between the retracted position and the deployed position.

12. The turbofan engine of claim 1, wherein a length of the inner door is substantially the same as a height of the passageway adjacent the opening.

* * * * *